United States Patent [19]

Lin

[11] Patent Number: 5,463,703
[45] Date of Patent: Oct. 31, 1995

[54] DITHER PICTURE DATA PRE-COMPRESSION PROCESSING METHOD

[76] Inventor: Bob Lin, No. 9, Lane 102, San Min Rd., Taipei, Taiwan

[21] Appl. No.: 194,581

[22] Filed: Feb. 10, 1994

[51] Int. Cl.$^6$ .............................. G06K 9/38; H04N 1/419
[52] U.S. Cl. ........................................ 382/251; 358/261.1
[58] Field of Search .......................... 382/50; 358/457, 358/427, 429, 426.1

[56] References Cited

U.S. PATENT DOCUMENTS

| | | | |
|---|---|---|---|
| 4,965,843 | 10/1990 | van Dorsselaer | 382/50 |
| 5,130,821 | 7/1992 | Ng | 358/457 |
| 5,201,013 | 4/1993 | Kumagai | 358/457 |
| 5,243,441 | 9/1993 | Kawata | 358/457 |
| 5,243,446 | 9/1993 | Pollich et al. | 358/429 |
| 5,251,046 | 10/1993 | Kato et al. | 358/429 |

Primary Examiner—Joseph Mancuso
Assistant Examiner—Gerard Del Rosso
Attorney, Agent, or Firm—Bacon & Thomas

[57] ABSTRACT

A dither picture data pre-compression processing method includes steps of dividing the picture document by a dither matrix into a plurality of pixel matrices; taking the pixel values of the same location from every pixel matrix and gathering them into respective groups, permitting every group to be respectively corresponded by a dither matrix element; and using the dither matrix element as the threshold value to process the pixel values of every group into a corresponding binary data for further picture data compression coding.

1 Claim, 18 Drawing Sheets

| WHITE LINE SEGMENT RUN LENGTH | CODE VALUE | BLACK LINE SEGMENT RUN LENGTH | CODE VALUE |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |

| 0 | 128 | 32 | 160 | 8 | 136 | 40 | 168 |
|---|---|---|---|---|---|---|---|
| 192 | 64 | 224 | 96 | 200 | 72 | 232 | 104 |
| 48 | 176 | 16 | 144 | 56 | 184 | 24 | 152 |
| 240 | 112 | 208 | 80 | 248 | 120 | 216 | 88 |
| 12 | 140 | 44 | 172 | 4 | 132 | 36 | 164 |
| 204 | 76 | 236 | 108 | 196 | 68 | 228 | 100 |
| 60 | 188 | 28 | 156 | 52 | 180 | 20 | 148 |
| 252 | 124 | 220 | 92 | 244 | 116 | 212 | 84 |

| 192 | 224 | 200 | 232 | | 64  | 96  | 72  | 104 |
|-----|-----|-----|-----|-|-----|-----|-----|-----|
| 48  | 16  | 56  | 24  | | 167 | 144 | 184 | 152 |
| 240 | 208 | 248 | 216 | | 112 | 80  | 120 | 88  |
| 12  | 44  | 4   | 36  | | 140 | 172 | 132 | 164 |
| 204 | 236 | 196 | 228 | | 76  | 108 | 68  | 100 |
| 60  | 28  | 52  | 20  | | 188 | 156 | 180 | 148 |
| 252 | 220 | 244 | 212 | | 124 | 92  | 116 | 84  |

FIG. 5

| 0   | 8   | | 128 | 136 | | 32  | 40  | | 160 | 168 |
|-----|-----|-|-----|-----|-|-----|-----|-|-----|-----|
| 192 | 200 | | 64  | 72  | | 224 | 232 | | 96  | 104 |
| 48  | 56  | | 176 | 184 | | 16  | 24  | | 144 | 152 |
| 240 | 248 | | 112 | 120 | | 208 | 216 | | 80  | 88  |
| 12  | 4   | | 140 | 132 | | 44  | 36  | | 172 | 164 |
| 204 | 96  | | 76  | 68  | | 236 | 228 | | 108 | 100 |
| 60  | 52  | | 188 | 180 | | 28  | 20  | | 156 | 148 |
| 252 | 244 | | 124 | 116 | | 220 | 212 | | 92  | 84  |

FIG. 6

| 0   | 128 | 32  | 160 | 8   | 136 | 40  | 168 |
|-----|-----|-----|-----|-----|-----|-----|-----|
| 192 | 64  | 224 | 96  | 200 | 72  | 232 | 104 |
| 48  | 176 | 16  | 144 | 56  | 184 | 24  | 152 |
| 240 | 112 | 208 | 80  | 248 | 120 | 216 | 88  |
| 12  | 140 | 44  | 172 | 4   | 132 | 36  | 164 |
| 204 | 76  | 236 | 108 | 96  | 68  | 228 | 100 |
| 60  | 188 | 28  | 156 | 52  | 180 | 20  | 148 |
| 252 | 124 | 220 | 92  | 244 | 116 | 212 | 84  |

FIG. 7

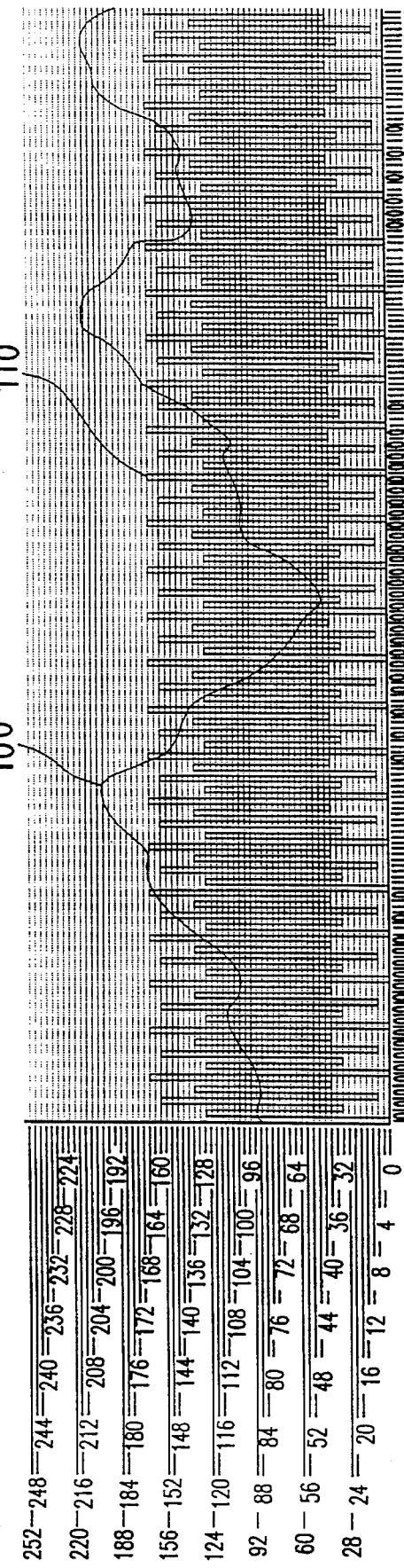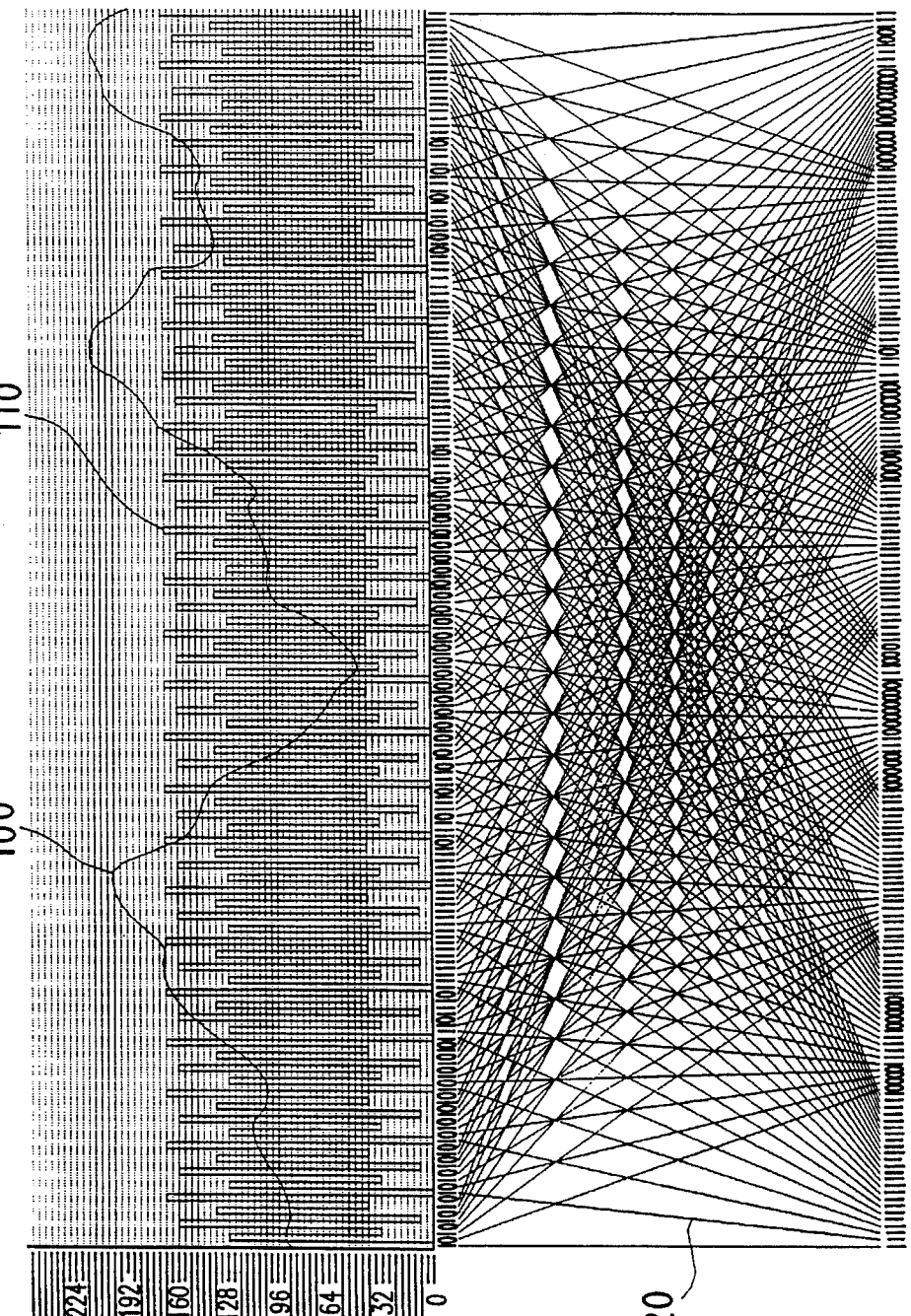
FIG. 8a
FIG. 8b

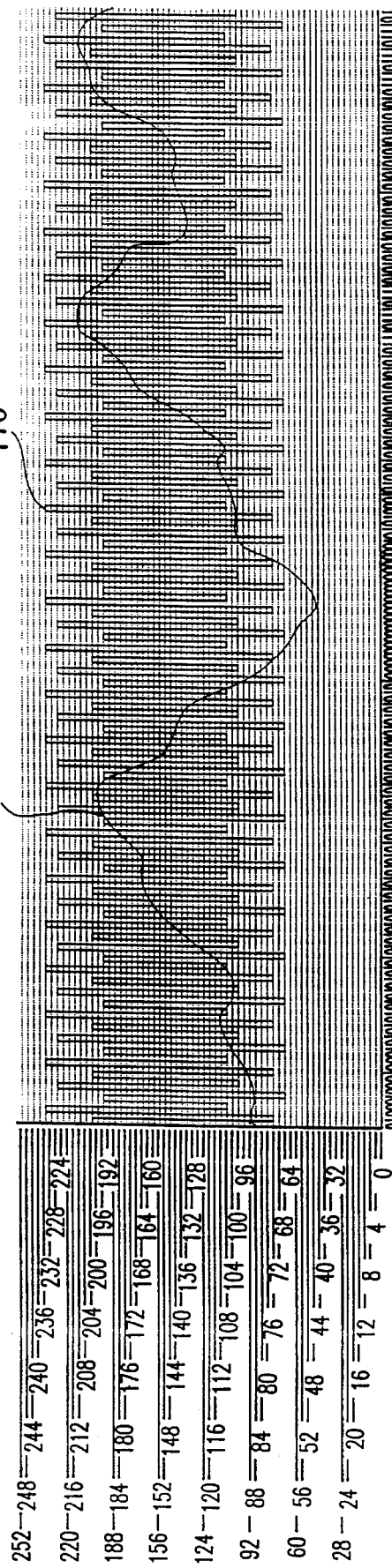
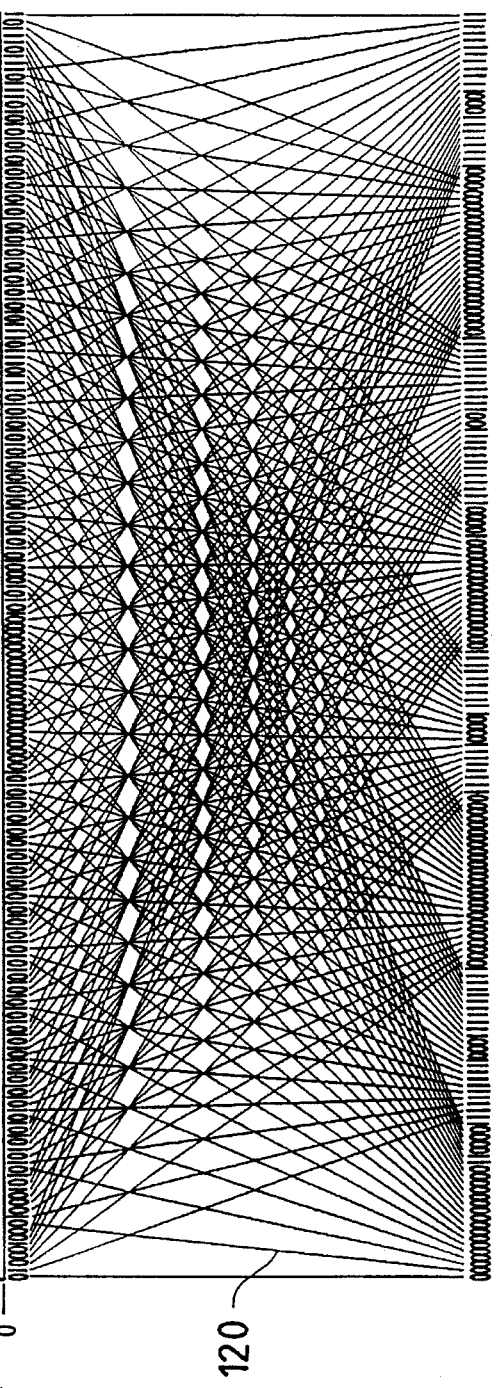
FIG. 8k
FIG. 8l

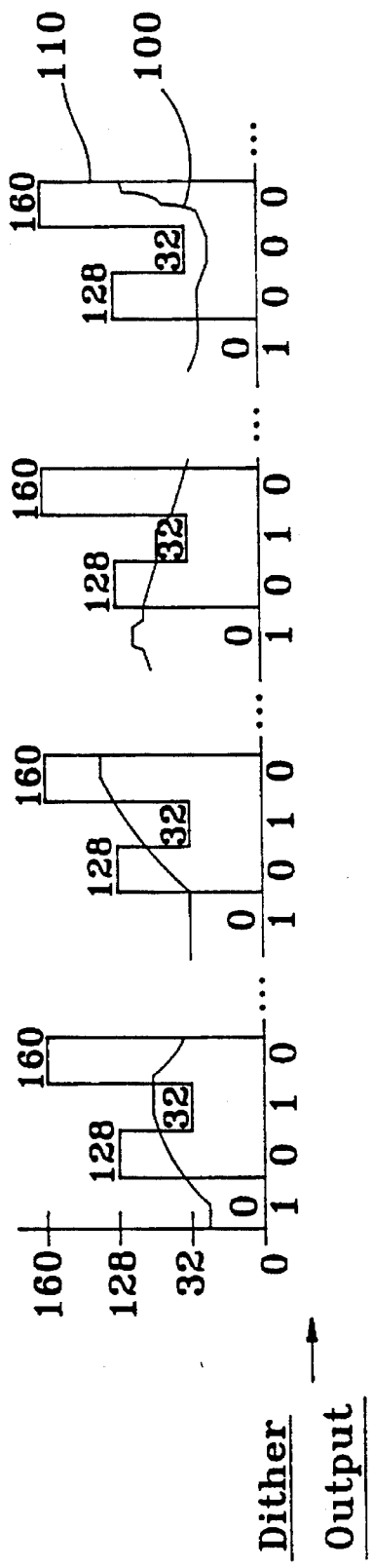

Dither Output
1 0 1 0 1 0 1 0 1 0 [1] 0 1 0 [0] 0

120

1 1 1 1   0 0 0 0   1 1 [1] [0]   0 0 0 0

Re-Arranged Dither Output

FIG. 10F

DITHER PICTURE DATA PRE-COMPRESSION PROCESSING METHOD

BACKGROUND Of THE INVENTION

The present invention relates to a preprocessing method to process dither picture data before the process of compression coding, which allows the amount of data to be greatly reduced after the process of compression coding so that picture data transmissions efficiency can be greatly improved.

Picture data is obtained by using an optical element (such as a charge coupled device) to scan the document and then using an analog/digital converter to convert the continuous analog signal thus obtained from the scanning into a continuous binary digital data (1 for white; 0 for black). This process is commonly employed in fax machines. In order to transmit hug picture data rapidly, picture data is commonly compressed to reduce its amount before transmission.

The source of the picture data could be an alphanumeric document, or a picture. The picture data of an alphanumeric document produced through scanning is bi-level data which can be easily processed and compressed by conventional fax machines because conventional fax machines emphasize the processing of alphanumeric documents rather than the processing of pictures, and their default setting is commonly in a black/white thresholded mode. However, a clear result cannot be obtained by using the black/white thresholded mode to process a picture. Therefore, conventional fax machines commonly provide a halftone mode (such as: dither method, error diffusion method, relative density assignment of adjacent pixels—CPIX etc.) to process the picture data of a picture so as to eliminate the aforesaid problem. However, the picture data of a picture obtained through a conventional half-tone mode is not suitable for the processing of compression coding. If the picture has a background color, the frequency of the alternation of block and white dots in the picture data of the picture obtained through either half-tone mode is much higher than that in the picture data of a picture obtained through the black/white thresholded mode. If the picture data is processed by a run length coding, such as the MH (modified huffman) coding method, its compression effect is clearly seen from the following explanation:

1. MH coding uses a horizontal scan line as one coding unit, and coding units are added when scanning from one horizontal scan line to another in the vertical direction until the whole page of the picture has been completely scanned. In the MH coding scheme, as shown in FIG. 1, "white line section run length" indicates the number of continuous white dots; "black line section run length" indicates the number of continuous black dots; and "code value" indicates the corresponding MH coding result.

2. According to the scanning example shown in FIG. 2, using the MH codes of FIG. 1, the original scanned data obtained from an optical scanning element and a digital converter is 01000111 (1 represents a white dot; 0 represents a black dot), and its total amount of data is 8-bits or 15-bits after compression through MH coding.

From the above explanation, the total amount of data is increased after compression through MH coding. This result is apparently against what we expect. Therefore, when a picture of A4 size is processed through dither mode, it takes about 7 minutes (at speed 9600 bps) to complete the transmission, however, it takes only few seconds to complete the transmission of an alphanumeric document of the same size. Therefore, black/white data of 2 bits in the above example will produce a code, 010000111, having a total of 9 bits after coding, namely, the amount of data will be increased by 4.5 times. This defeats the object of using a coding method, which is to compress the data to be transmitted and not to increase it. Either MH, MR or MMR coding method cannot effectively eliminate the aforesaid problem.

Therefore, the half-tone mode of regular fax machines is not set to the receiver's satisfaction, and it produces thicker dots to reduce the possibility of the appearance of a series of alternatively arranged black and white dots so as to improve the compression efficiency. However, when the compression efficiency is improved, the resolution of the picture is relatively reduced. Because of this reason, the half-tone mode of regular fax machines is less practical.

There is known a pattern run length mode commonly used in computers, which inserts a respective mark and a respective pattern into continuous data in front of each of identical data segments. For example: if the data is 010101010101 . . . the pattern can be 55H, and then the number of the pattern 55H in the data may be calculated. This method greatly improves the compression ratio.

There are still other methods disclosed for improving the compression ratio, however, they have in common the following two drawbacks.

1. If the picture has changes in color level, most known methods become ineffective because the picture has low regularity and a complicated mathematical operation must be employed in order to obtain a relatively better result.

2. They are completely different from regular MH, MR, MMR compression methods, and therefore they cannot utilize the advantage and popularity of regular compression coding modes. Therefore, they must define the coding and EOF mark, prevent data from mixing with the control code, decode the posterior data when a row of data in interfered with by noise, and spend much time in improving its applicability in transmission. It is not useful to design a new fax machine coding method if its effect in improving the compression efficiency is not sure.

However, everyone wishes to obtain a fax machine of high receiving resolution, fast transmission speed, super fine mode (300 dpi or 400 dpi), or even a color fax machine. Currently, transmission in telephone lines has been improved from 9600 Baud rate up to 14,400 Baud rate (V. 17). Therefore, there is a heavy demand for a data compression method which allows a fax machine to transmit gray scale or color documents.

SUMMARY OF THE INVENTION

The present invention has been accomplished under the aforesaid circumstances. It is therefore the principal object of the present invention to provide a dither picture data pre-compression processing method which greatly improves picture data transmission efficiency, namely, picture data compression efficiency. It is another object of the present invention to provide a dither picture data pre-compression processing method which allows fax machines and the like to re-arrange the picture data before transmission, for permitting the amount of picture data to be greatly reduced after the process of compression.

BRIEF DESCRIPTION OF THE DRAWINGS

FIG. 5 shows a pixel matrix divided into two 4×8 sub-matrices according to the present invention;

FIG. 6 shows the pixel matrix divided into four 2×8 sub-matrices according to the present invention;

FIG. 7 shows the pixel matrix divided into eight 4×8 sub-matrices according to the present invention;

FIGS. 9A through 9F show an example of the application of the present invention.

FIGS. 10A–10F illustrate the manner in which the mappings of FIGS. 8L–8LG are obtained, starting from a scaled-down version of FIG. 8U.

DETAILED DESCRIPTION OF THE PREFERRED EMBODIMENT

Figures 1, 2:
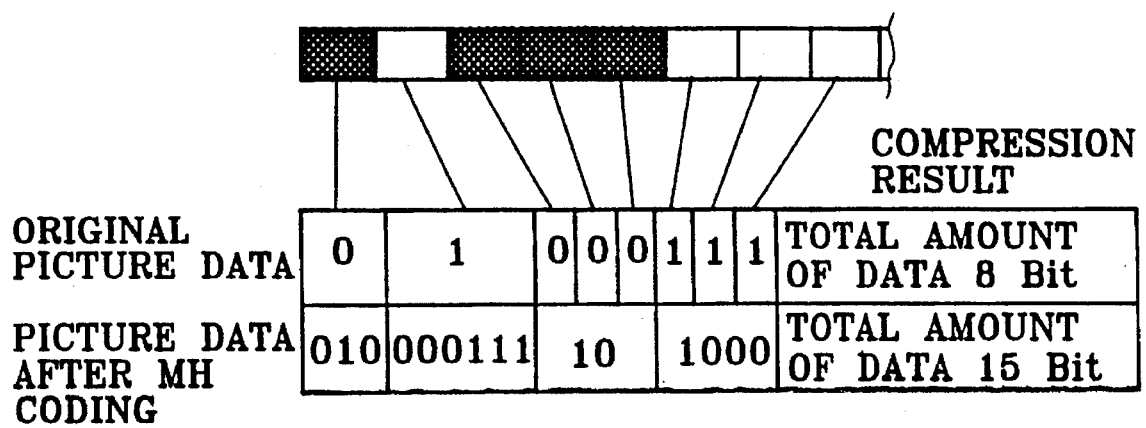
FIG. 1 is a partial coding scheme obtained through modified huffman coding mode.
FIG. 2 shows a compression example of part of a horizontal scan line processed through modified huffman coding mode.
Figures 3, 4:
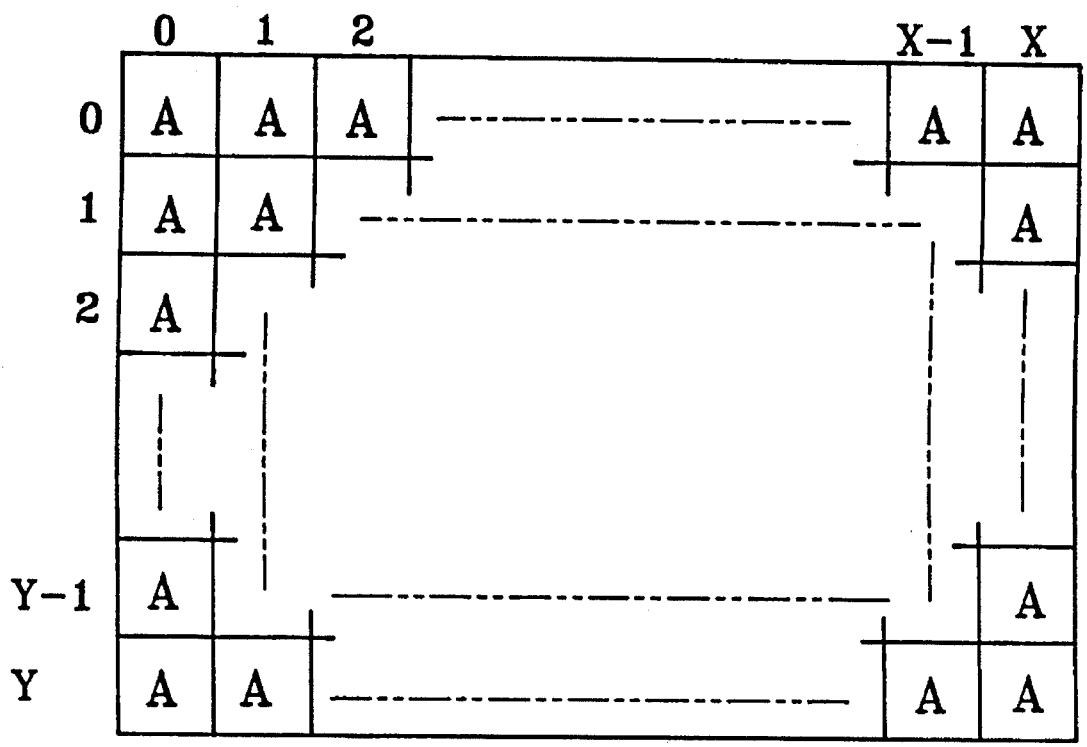
FIG. 3 shows a picture divided into continuous pixel matrices according to the present invention.
FIG. 4 shows the arrangement of a dither pattern according to the present invention.

Referring to FIG. 3, a picture to be transmitted through a fax machine according to the present invention is divided into continuous regions represented by pixel matrices [A], and the pixel value of every pixel element in each pixel matrix [A] obtained from scanning the picture represents the shade at the location of the respective pixel element. Then, the present invention uses a single dither pattern [B] corresponding in size to the pixel matrix [A] as a threshold for comparing with the pixel matrix [A], i.e., every element of the dither matrix [B] corresponds to a corresponding pixel value in the pixel matrix [A], or in other words, the dither matrix [B] is respectively superposed on every equal pixel matrix [A]. It is to be understood that every pixel element in the pixel matrix [A] is a pixel value (shade) directly obtained by scanning the picture. Because the data obtained from the scanning of a regular fax machine and the conversion through an analog/digital converter is of 8-bit width, the pixel value obtained from the scanning of the picture has a total of $2^8=256$ gray scale values (the value is within 0 to 255, and the total gray scale value varies with the data width obtained through the conversion of the analog/digital converter). A pixel value obtained from one horizontal scan line, represented by the wavy line 100 shown in FIG. 8 is within 0 to 255, and a different value will be obtained for a different horizontal scan line 110.

FIG. 4 shows an example of the dither pattern [B]. According to this example, the dither pattern [B] is a 8×8 matrix. Because the dither pattern [B] is a 8×8 matrix, it consists of total 64 elements, namely, 64 threshold values which compare with the total 256 gray scale. The 64 threshold values are different from one another, namely, 0, 4, 8, 12 . . . 252. The locations of the 64 threshold values in the dither pattern [B] can be freely set by the user. In FIG. 4, the threshold values in the first row are 9, 128, 32, 160, 8, 136, 40, 168 which correspond to the pixel values obtained from the first horizontal scan line. When the pixel value surpasses the corresponding threshold value, the output after dither processes is "1" (white dot); in the contrary case where the pixel value does not surpass the threshold value, the output is "0" (black dot). This binary processing process conforms to the processing principles of conventional dither methods. From the eight threshold values in the first row shown in FIG. 4, we can see a big difference between any two adjacent threshold values, and therefore a high resolution picture can be obtained. Because there is a big difference between any two adjacent threshold values in the first row, when the first row is processed into binary picture data through the aforesaid dither method, the result will be 0101010101 as indicated by FIG. 8 (the bigger the difference between adjacent values in the dither matrix, the more likely that corresponding adjacent values will be above (binary "1") and below (binary "0"), respectively. As described before, if this result is further compressed through MH coding, the total amount of data will be increased. However, if we separate the dither matrix [A] into two 4×8 sub-matrices by separating odd columns from even columns of the matrix shown in FIG. 4 to obtain the matrix of FIG. 5, we find that the amplitude between any two adjacent values in any row in either matrix is not large (for example, the first row of the first sub-matrix is 0, 32, 8, 40; and the first row of the second sub-matrix is 128, 160, 136, 168). If we separate the pixel matrix [A] into four 2×8 sub-matrices (as shown in FIG. 7), we can see that there is little difference between adjacent values in each line (see FIG. 6) or no difference (see FIG. 7). The present invention utilizes this characteristic to improve the picture data compression ratio.

The processing of the present invention is explained hereinafter using 4×8 pixel matrices [A] as an example. We take pixel values (of the same row and same column or only of the same row) from all pixel matrices and gather them into respective groups permitting every group to respectively correspond to a dither matrix element (threshold value) of the same size, and then respectively compare the pixel values of each group with the dither matrix element by processing every pixel value of each group into corresponding binary data. If a pixel value surpasses the value of the dither matrix element, it is converted into a "1"; but if a pixel value is smaller than the value of the dither matrix element, it is converted into a "0". After having been converted into respective binary data, the groups are then arranged in proper order. Therefore, the order of the picture data to be compressed is changed, and every group may contain black dots only or white dots only, i.e., the picture data obtained from the aforesaid process has good continuity and is very suitable for compression by modified huffman coding.

The meaning of arranging the data in groups is best illustrated in FIGS. 10A to 10F. FIG. 10A is a scaled-down version of FIG. 8 using the first four elements in the dither matrix shown in FIG. 4. The output, 1010101010101000, is highly variable and corresponds to the highly variable dither matrix elements, as illustrated in FIG. 10B. If all of the output bits corresponding to like elements are grouped, however (see FIGS. 10C and 10D), the re-arranged output shown in FIG. 10F will be highly regular and much more efficiently compressed. The resulting map (FIG. 10E) can be used for all scan lines.

From the eight pictures shown in FIGS. 8a, 8c, 8e, 8g, 8i, 8k, 8m and 8o which represent successive scan lines 100 and corresponding successive lines of the dither matrix 110, we can see the result of dividing a picture by an 8×8 dither matrix. These eight pictures represent the eight horizontal scan lines on the picture from the top to the bottom. Hereinafter is an explanation of the processing of the present invention on an 8×8 pixel matrix [A], as illustrated by FIGS. 8a, 8c, 8e, 8g, 8i, 8k, 8m and 8o.

Compare the eight threshold values on the first row of the dither matrix shown in FIG. 4, 0, 128, 32, 160, 8, 136, 40, 168 (see the first lien of continuous rectangular waves (110)

in FIG. 8) with the pixel values of the pixel elements of the same horizontal line in the pixel matrix shown in (the line of continuous irregular waves 9100) in FIG. 8) so as to obtain binary data (it is regarded as "1" if the pixel value surpasses the threshold value, or regarded as "0" if the pixel value is smaller than the threshold value) i.e., the pixel values 1, 9, 17 . . . of the horizontal scan line are respectively compared with the threshold value 0; the pixel values 2, 10, 18 . . . of the horizontal scan line are respectively compared with the threshold value 128, and the rest can be inferred by analogy.

As shown in FIGS. 8b, 8d, 8f, 8h, 8j, 8l, 8n 8p and, the binary data obtained by comparing with 0 are gathered into a first group (as indicated by line 120), the binary data obtained by comparing with 128 are gathered into a second group, and therefore a total of eight groups of binary data obtained. Lines 120 represent the mapping or correspondence between the dither output and the re-arranged data. For the reasons best understood from FIGS. 10A–10F, the majority of the picture data of either group will be "1" or "0". This result greatly reduces the amount of data left after compression by modified huffman coding, and the transmission efficiency is therefore improved.

Figure 8C:
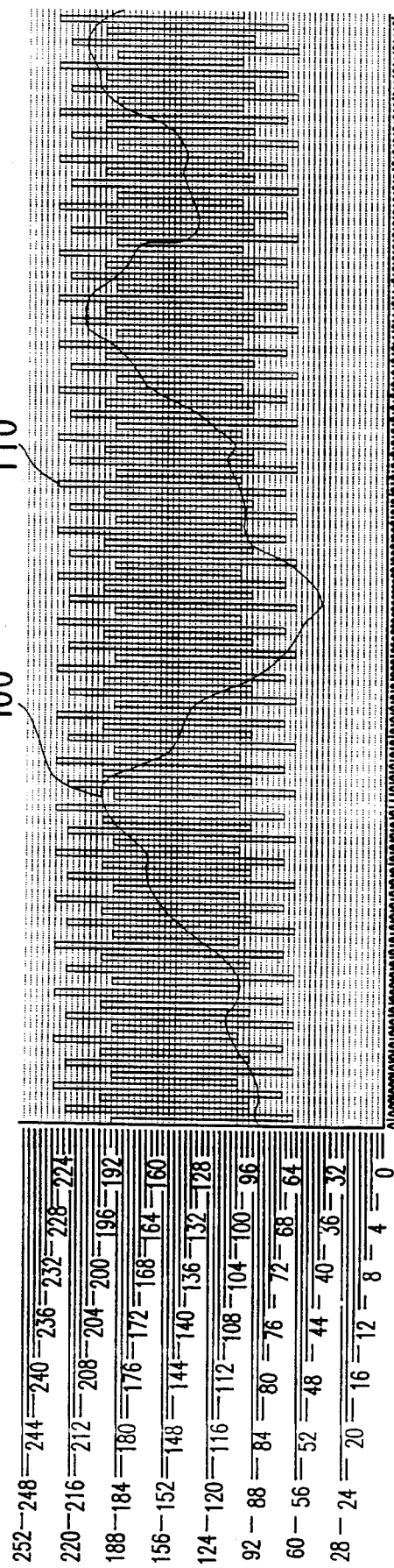
FIGS. 8a through 8p show the result of the comparison of the pixel values on a horizontal scan line with different threshold values and the mapping used to re-arrange the dither.
Figure 8D:
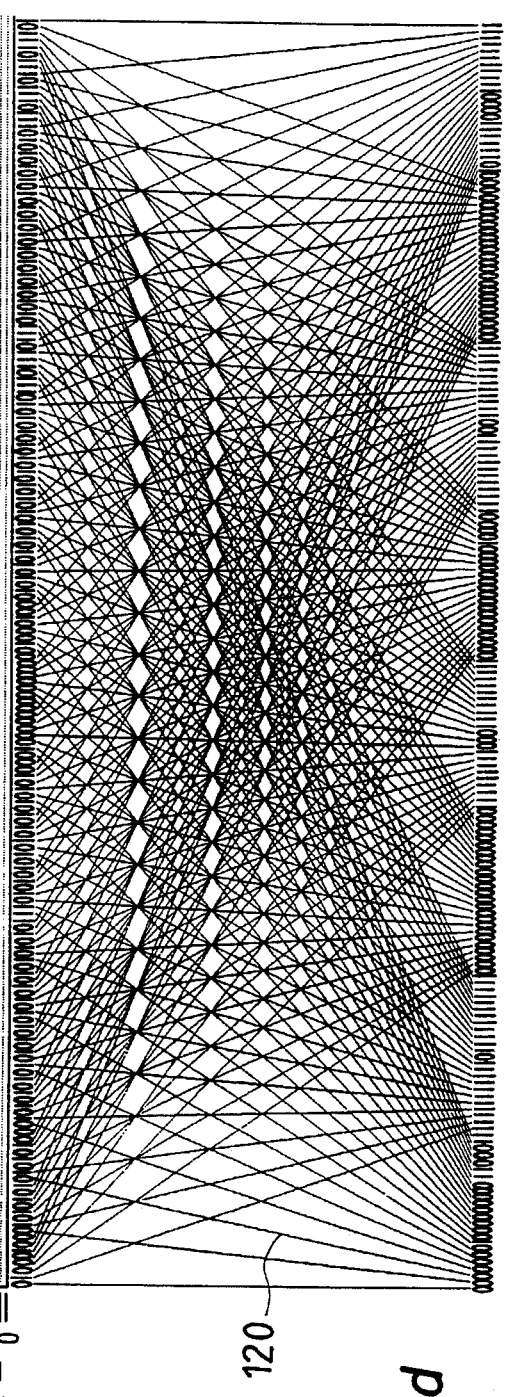
Figures 8E, 8F:
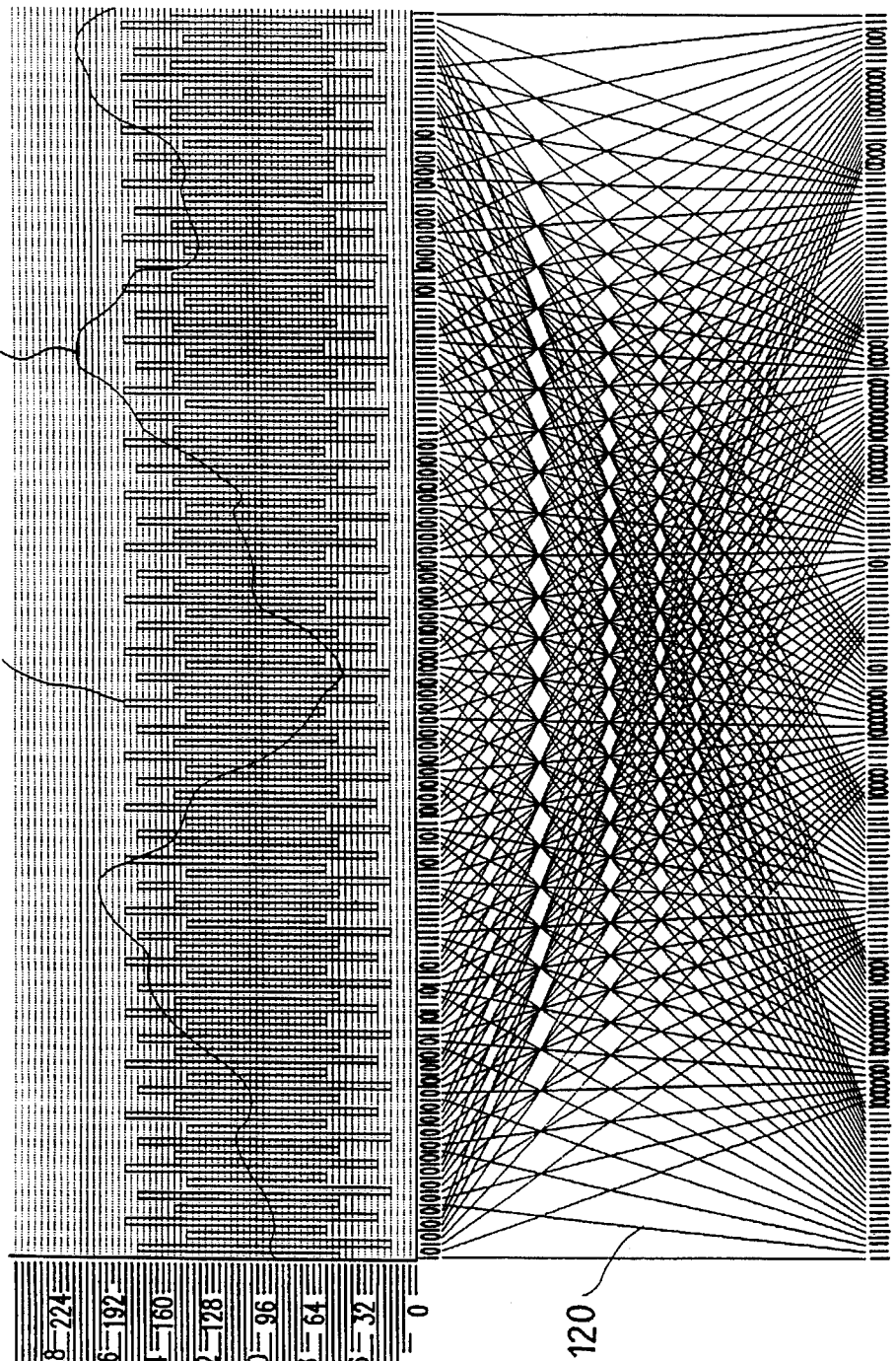
Figure 8G:
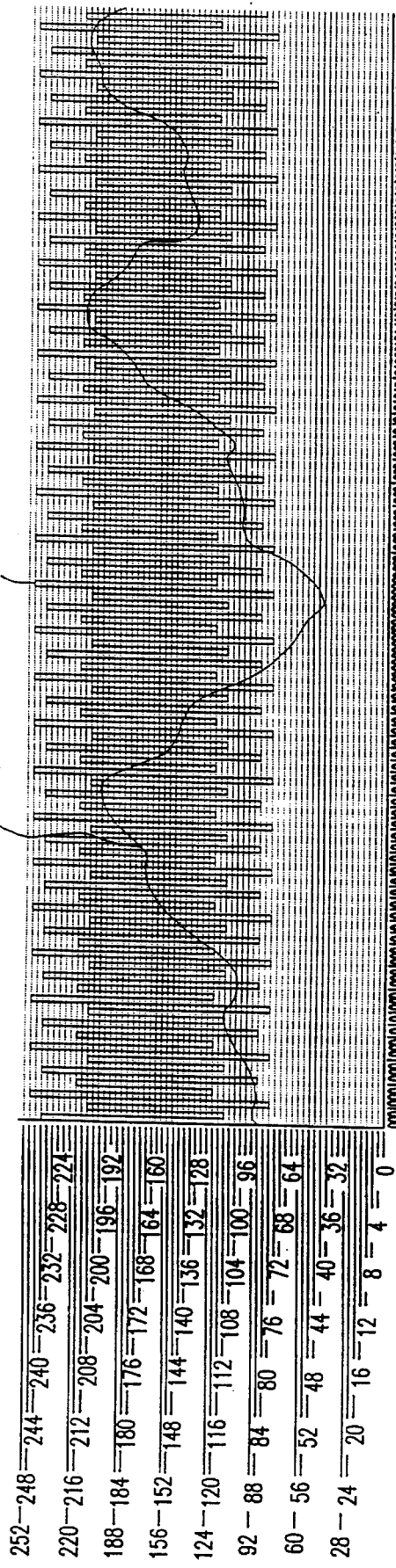
Figure 8H:
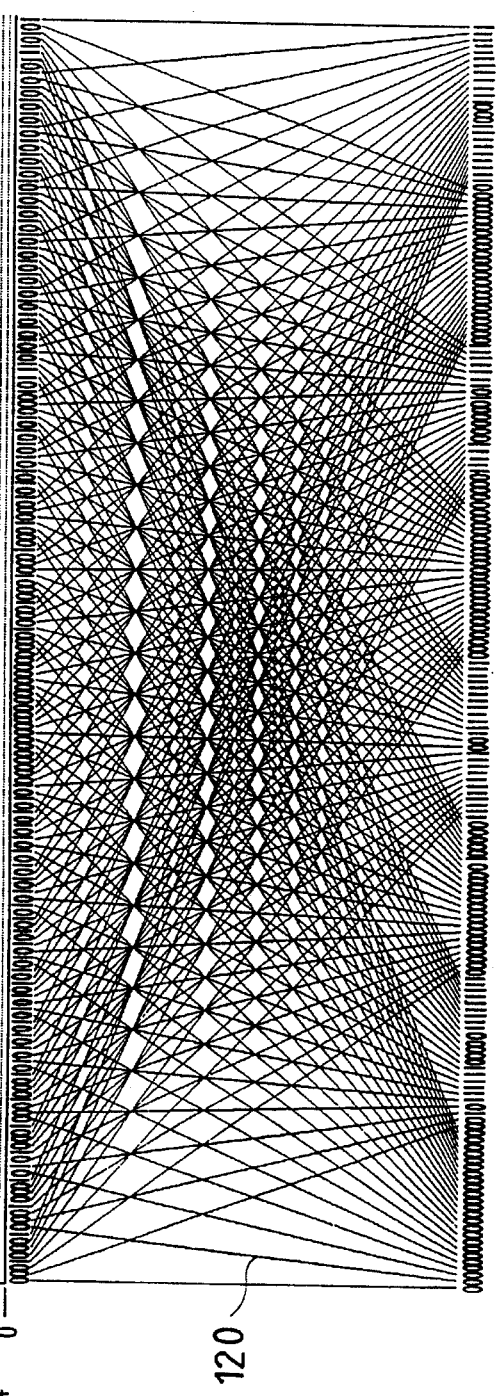
Figure 8I:
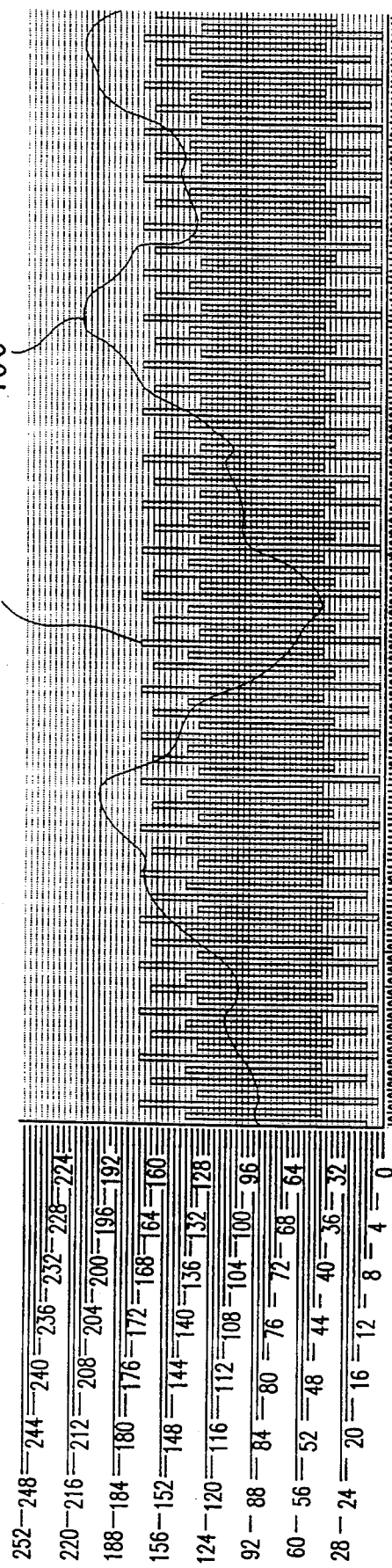
Figure 8J:
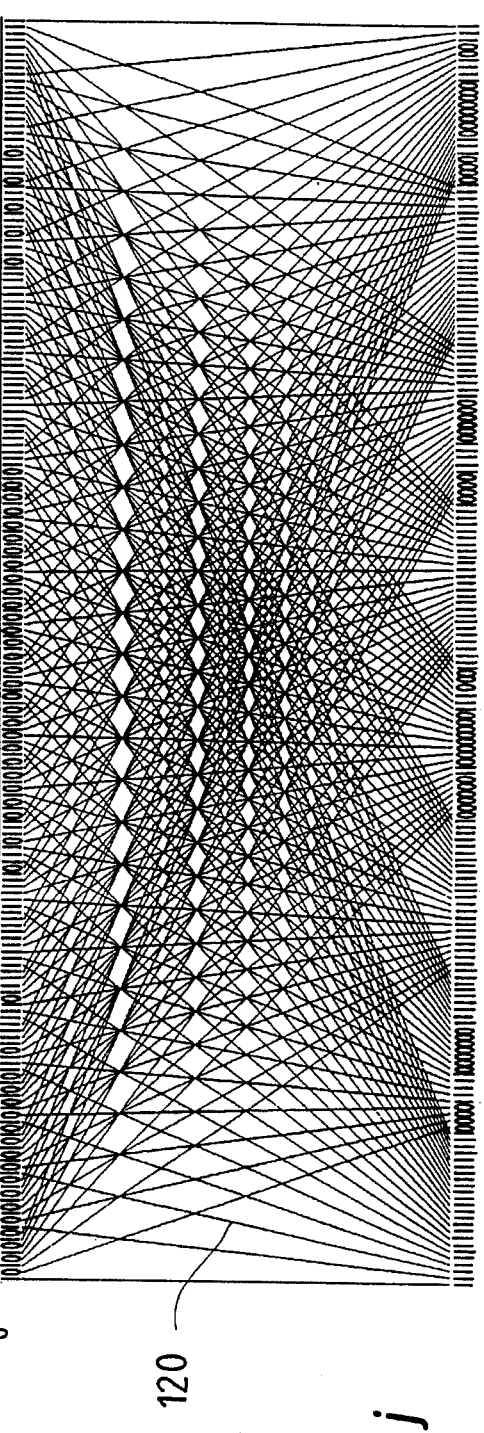
Figure 8M:
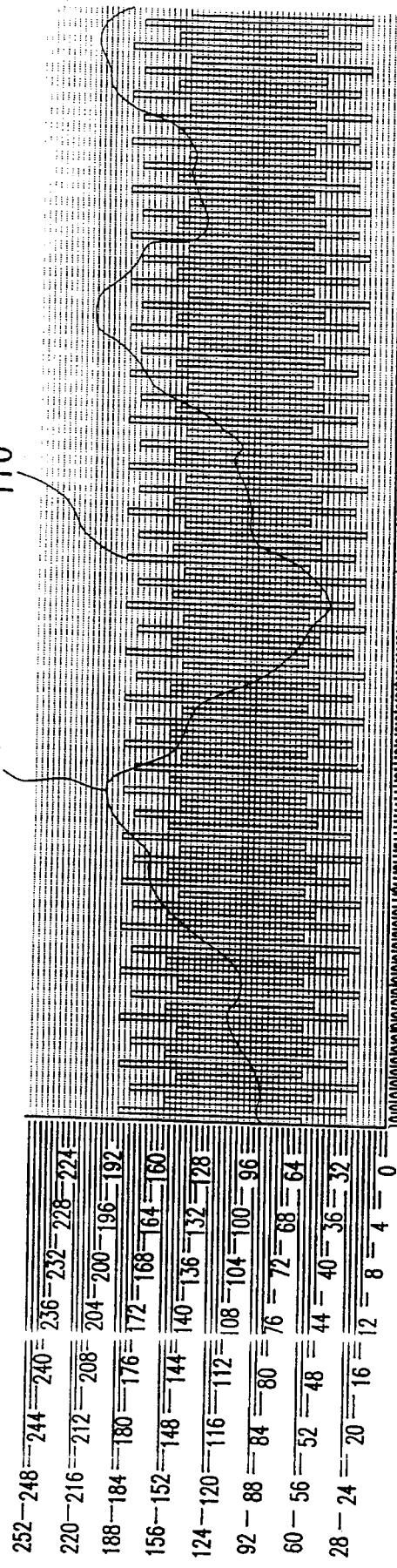
Figure 8N:
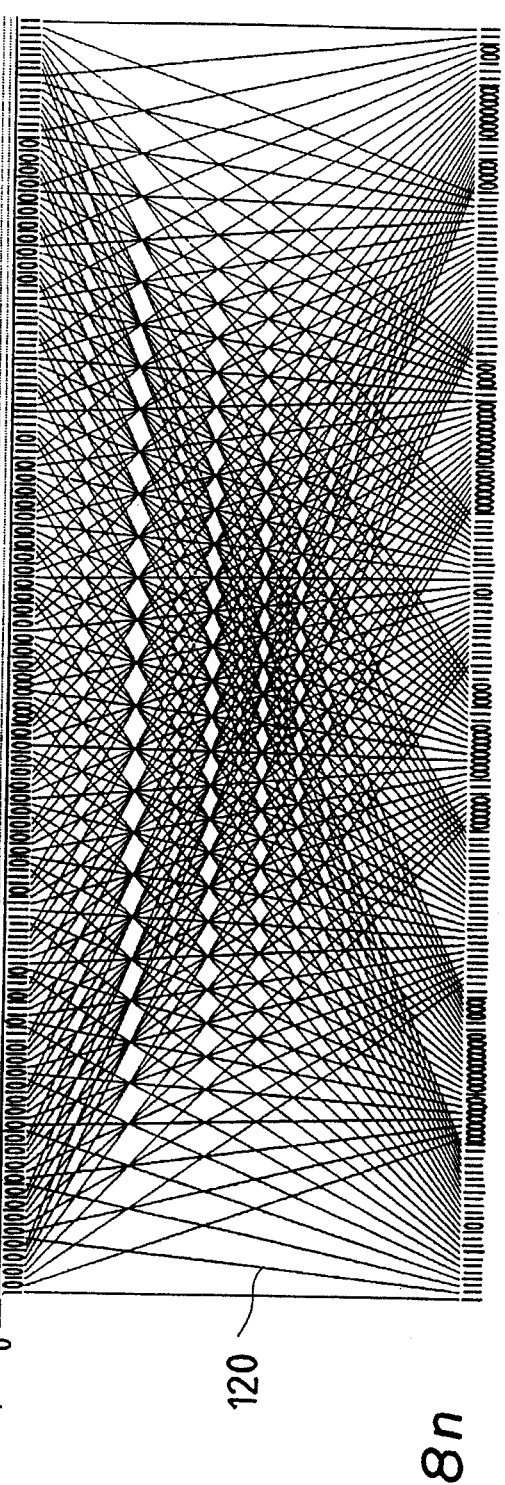
Figure 8O:
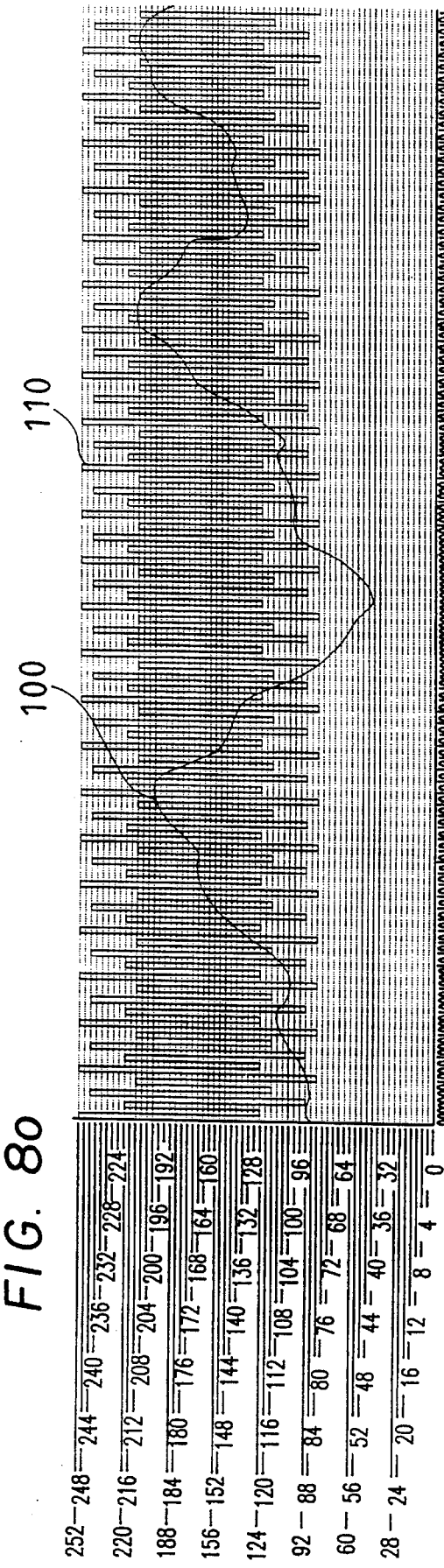
Figure 8P:
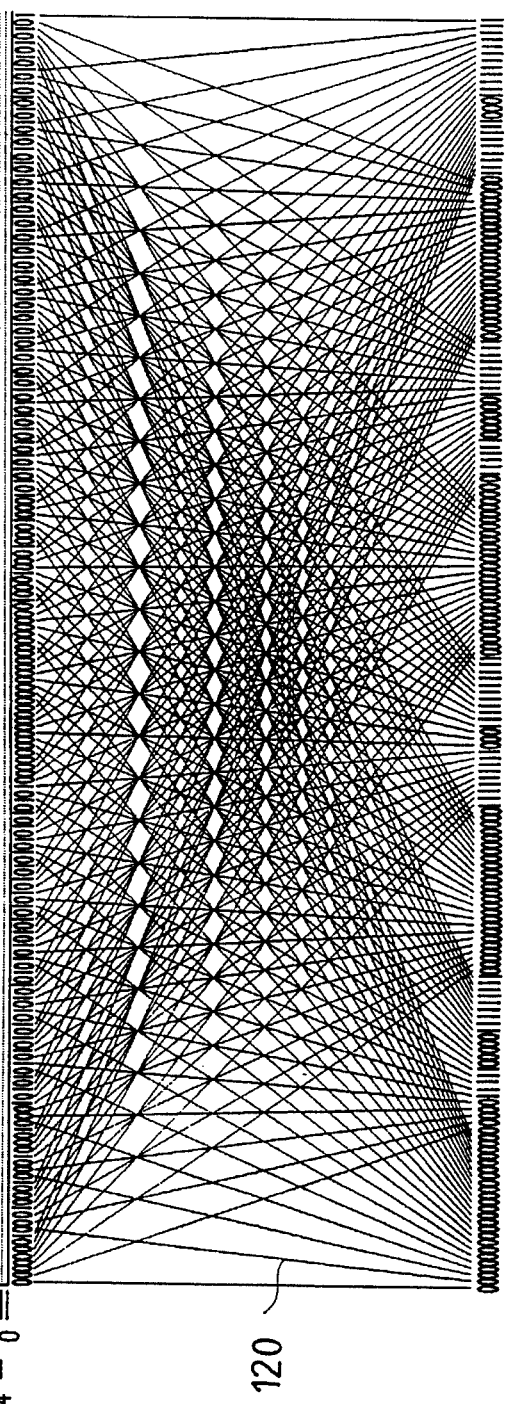

Further, from the seven pictures shown in FIGS. 8a through 8p, we can see that the pixel values from the same horizontal scan line after having been compared with seven different threshold values (the line 110 of rectangular waves in either picture) and converted into respective binary data and gathered into respective groups shown in FIGS. 8b, 8d, 8f, 8h, 8j, 8l, 8n and 8p have good continuity. According to actual practice, the amount of data after compression will be reduced to one fifth when processed through the present processing method in comparison with that without being processed through the processing method of the present invention.

Figure 9A:
Figure 9B:
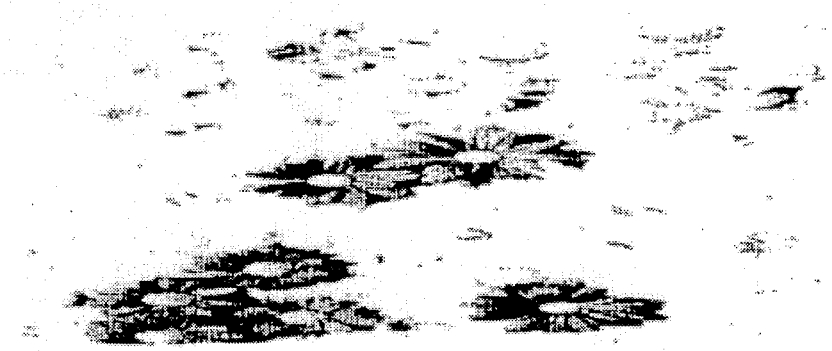
Figure 9B:
Figure 9B:
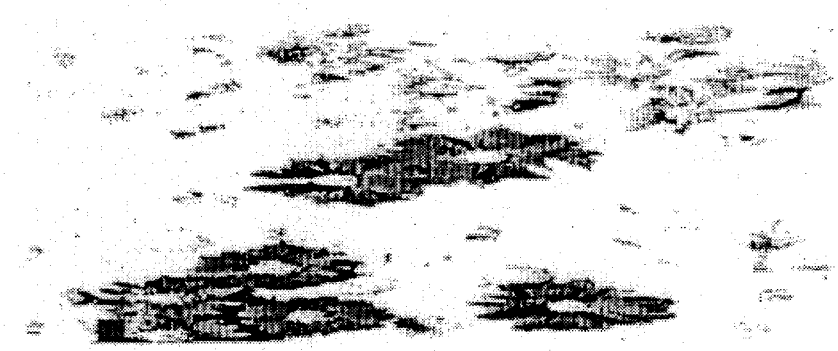
Figure 9B:
Figure 9C:
Figure 9D:
Figure 9E:

Referring to FIGS. 9 through 9F, the arrangement of the compressed picture data being transmitted is different from the arrangement being originally scanned, and the compressed picture data is arranged in respective groups. FIG. 9A shows the original picture document. FIG. 9B shows the picture data processed into four groups and separately transmitted without being synthesized. FIGS. 9C through 9F are enlarged views of the four groups. From the enlarged views, we can see good continuity of shades, and therefore the transmission speed will be very fast if the groups are separately transmitted. In order to let the receive a whole copy of the original picture document, a control code is given to the picture data to be transmitted, to inform the receiver that the data being received is compressed data from separate groups. When the control code is given, the picture data can then be transmitted through MH or MR coding. The receiver, when the control code is received, can then re-arrange the compressed picture data, and therefore a whole copy of the original picture document is recovered. The control code can be easily achieved through existing programmable hardware equipment. Because the providing of the control code is not within the scope of the invention, it is not necessary to describe it in detail.

The setting of the dither matrix [B] is explained hereinafter. The size of the dither matrix [B] must be equal to the pixel matrix [A] divided from the picture document, i.e., the dither matrix [B] and the pixel matrix [A] are matrices having the same number of rows and same columns. The number of elements of the dither matrix [B] (64 elements if it is a 8×8 matrix) must be respectively compared to the total gray scale being converted through an A/D converter (for example, if the width of the converted data is 8-bit, the total gray scale is 2⁸=256, and the total gray scale 256 must be compared by the 64 elements of the dither matrix [B]). If the number of rows and columns of the dither matrix [B] is changed, the total gray scale is changed, and we can obtain the following mathematical equations:

Total gray scale=$2^x$, in which:

X=the number of bits of the data being converted.

The difference between two adjacent threshold values is equal to the ratio of the total gray scale to the total number of elements (number of rows x number of columns) of the dither matrix [B]. The arrangement of the elements (threshold values) of the dither matrix [B] can be freely set by the user.

I claim:

1. In a method of processing a document after scanning in order to improve run-length coding efficiency, comprising the steps of:

binarizing the document by comparing the data in a scan line with corresponding values in a line of a dither matrix to obtain a dither output, the improvement comprising the step of:

re-arranging the dither output before compression by grouping together those bits of the dither output obtained by said comparing with a first element of the dither matrix into a first group, grouping together those bits of the dither output obtained by said comparing with a second element of the dither matrix into a second group, and continuing said grouping for each element of said dither matrix, until all of the bits of the dither output have been thus grouped.

* * * * *